3,677,778
Patented July 18, 1972

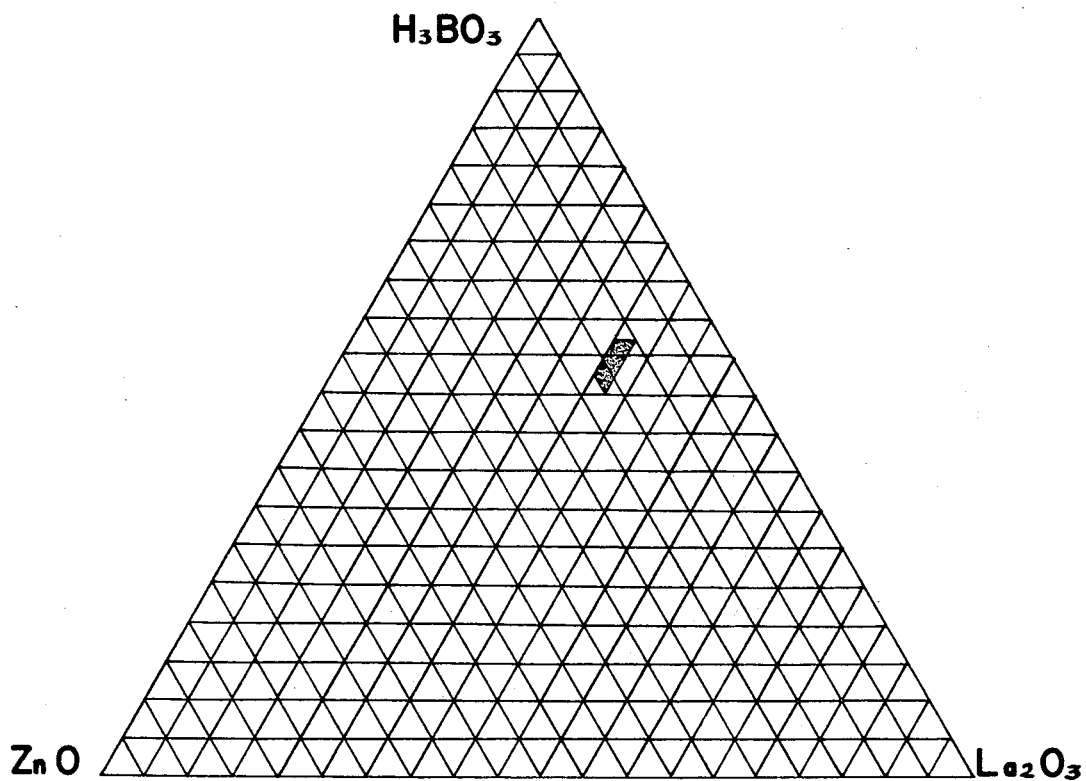

3,677,778
ZINC-LANTHANUM BORATE GLASS COMPOSITION
Mir Akbar Ali, Evanston, and Murray A. Schwartz, Glencoe, Ill., and Pei Ching Li, Hopewell Junction, N.Y., assignors to IIT Research Institute, Chicago, Ill.
Filed Sept. 16, 1969, Ser. No. 858,450
Int. Cl. C03c *3/00, 13/00*
U.S. Cl. 106—47 Q            2 Claims

ABSTRACT OF THE DISCLOSURE

A glass suitable for the transmission of radiation in the near ultraviolet region. The glass is composed of $B_2O_3$, $La_2O_3$ and ZnO and is substantially free of ultraviolet absorbers.

---

The present invention relates to glass compositions. More particularly, it is directed to glass compositions having high light transmission properties in the near region of the ultraviolet wavelength range as well as other desirable properties.

Light in the broadest sense of the word includes radiation of all wavelengths from infrared through visible and ultraviolet. One portion of the light spectrum in the ultraviolet range has been designated the near ultraviolet region and includes wavelengths from 300 to 400 nanometers. It has long been known that particular glass compositions transmit certain wavelengths while absorbing others. Ordinary optical glass, for example, may transmit visible light very efficiently though it absorbs over 90 percent of the ultraviolet radiation in the near ultraviolet region. The absorption of ultraviolet radiation is caused in part by the presence of certain elements and compounds which are well known. These materials are called ultraviolet absorbers and may seriously impair ultraviolet transmission even when they are present only in minute quantities.

The first requirement of an ultraviolet transmitting glass is that it be sufficiently free of ultraviolet absorbers to transmit a reasonable amount of light at the desired wavelength. For purposes of the present invention the lower limit of acceptable transmission will be defined as 50 percent of the radiation received at the outside surface of the glass of the desired thickness.

Materials for transmitting ultraviolet radiation are available and include diamond, quartz and some special glasses. Each of these materials suffers some limitation in properties which makes them ess than satisfactory for commercial applications. Most serious of the shortcomings of such materials are poor workability, high water solubility and too low an index of refraction.

The poor workability, high water solubility and low index of refraction of known ultraviolet transmitting materials are particularly serious when it is desired to use the ultraviolet transmitting glass in fiber optics applications, for example, as a faceplate for a cathode ray tube in order to give a better resolution than is obtained with standard bulk glass faceplates. It is well-known that for fiber optic applications the core glass of the fiber must have a high refractive index as compared to the refractive index of the cladding glass surrounding the core glass in order to obtain high light transmitting efficiency.

The difference in refractive indices of the core and cladding is reflected in the numerical aperture (N.A.) of the fiber, which is an indication of the efficiency with which an optical fiber conducts light through its length. It is a well-known function of the refractive indices of the two glasses employed as the core and the cladding material and is defined by the equation $N.A. = \sqrt{N_1 - N_2^2}$ where $N_1$ and $N_2$ are the refractive indices of the core and cladding respectively. In order to achieve good light transmission in fiber form the material used for the fiber core and the material used for the cladding glass should preferably produce a numerical aperture greater than 0.80. Since cladding materials currently available possess a refractive index ranging from 1.49 to 1.56 substitution in the above equation results in a value for the core glass refractive index of at least 1.70 to achieve the desired numerical aperture of 0.80 or higher. This relationship forms the basis for the stated need for a suitable glass possessing a high refractive index. It should be pointed out at this point that the numerical aperture is not related to the internal transmission referred to earlier but is a function only of the relative refractive indices of the two glasses.

In addition to a high refractive index, a glass suitable for use as a fiber optics core material must be capable of being worked into filamentary form preferably without great difficulty and expense. It should further have characteristics compatible with available cladding glass in terms of coefficient of thermal expansion and chemical compatibility and should not be subject to deterioration of transmission properties due to exposure to ultraviolet radiation.

Accordingly, it is an object of the present invention to provide a fabricable glass composition having high light transmission properties in the near region of the ultraviolet range.

It is a further object of the present invention to provide an ultraviolet transmitting glass having a high index of refraction.

These and other objects of the present invention will become apparent in connection with the following description and the drawing which shows, in triangular coordinates, the preferred ranges of the three components which make up the glass composition of the present invention.

The present invention is directed to a ternary lanthanum-zinc-borate glass composition consisting essentially of $B_2O_3$, $La_2O_3$ and ZnO which is the fusion product of essentially chemically pure $H_3BO_3$, $La_2O_3$ and ZnO in ranges of percentages by weight as follows: $H_3BO_3$, between about 50% and about 57%; $La_2O_3$, between about 30% and about 33%; ZnO, between about 10% and about 17%. During the fusion the $H_3BO_3$ is converted to $B_2O_3$. The compositions falling within these ranges are represented by the shaded area of the graph. Compositions in this ternary system outside the specified ranges do not produce a glass having a high index of refraction and appreciable light transmission properties in the near ultraviolet region. A preferred composition for the present invention consists essentially of 54.0% $H_3BO_3$, 32.7% $La_2O_3$, and 13.3% ZnO. This particular composition produces a glass having a refractive index of about 1.73 at 320 nanometers wavelength and provides greater than 55.0% transmission at that wavelength through a ½ inch thickness.

The described glass composition, in addition to a high ultraviolet transmission and high refractive index, may be easily drawn into bubble free fibers and has a coefficient of thermal expansion easily matched by other glasses such as commercially available cladding glasses. This combination of properties causes the glass composition to be ideally suited for fiber optics applications, although it is apparent that the glass may be used in the applications other than fiber optics if desired.

As indicated, the glass composition is the fusion product of essentially chemically pure $H_3BO_3$, $La_2O_3$ and ZnO. The additions of some elements or oxides to the ternary system is considered deleterious, and is to be avoided. In particular, the ultraviolet absorbers, Fe, Ti, S, U, Ge, Mn, Cu, Ag, Au, V, Nb, Ta, Cr, Mo, W, Re, Pt, Rh, Bi, Pb, Ce and some of the other rare earths are to be avoided. Even trace amounts of these materials have a deleterious effect on the transmission efficiency of the glass employed.

The most troublesome component of the glass of the present invention in terms of purity is the $La_2O_3$ which tends to contain impurities of the ultraviolet absorbing variety. Accordingly, $La_2O_3$ of 99.997% purity was employed in formulating the glasses of the present invention. For the $H_3BO_3$ and ZnO standard reagent grades are sufficiently free of harmful impurities to be employed.

TABLE

| Batch number: | Composition, percent by weight | | |
|---|---|---|---|
| | $H_3BO_3$ | $La_2O_3$ | ZnO |
| 1 | 54.0 | 32.7 | 13.3 |
| 2 | 52.7 | 32.3 | 15.0 |
| 3 | 53.0 | 30.0 | 17.0 |
| 4 | 55.0 | 33.0 | 12.0 |

The table illustrates the compositions of several glasses formulated in accordance with the present invention including the preferred composition designated as batch number 1. Each glass exhibits an index of refraction in excess of 1.70 and a light transmission at 320 nanometers in excess of 50% through a ½ inch thickness. Each composition was formulated by weighing the components in powder form and mixing them together. Fusion was achieved in a pure platinum crucible maintained at a temperature of 1050° C. for eight hours in a pure alumina muffle furnace. Although higher temperatures and longer times are not recommended, the particular temperatures and times employed in the fusion are within the ordinary skill of the art and do not form part of the invention. Upon cooling the glass compositions were clear and colorless, and could be easily fabricated into desired forms, for example, into bubble free glass fibers of a diameter of 5 mils.

The glasses of the present invention also transmit visible light unless doped with a visible light absorbing substance, for example, nickel oxide. They are chemically compatible with common cladding glasses and possess coefficients of thermal expansion in the range of 55 to $75 \times 10^{-7}$ cm./cm./° C.

The glass compositions of the present invention as disclosed and claimed herein are novel compositions exhibiting improved properties for the transmission of ultraviolet light while retaining a high index of refraction and good mechanical properties. These properties are particularly useful in the growing field of fiber optics.

It should be understood, however, that the foregoing is presented by way of description of one environment in which the glass compositions of the present invention find utility. The compositions are in no way restricted to such applications and also find utility in bulk form.

What is claimed is:

1. A UV transmitting glass composition suitable for use as a core glass in a UV transmitting fiber optic cathode ray tube faceplate and having a refractive index above about 1.70, suitable for achieving a numerical aperture of about 0.80 or more in a fiber optic and exhibiting good light transmission properties in the near ultraviolet range said composition consisting of the fusion product of between about 50 and about 57 weight percent $H_3BO_3$, between about 30 and about 33 weight percent high purity $La_2O_3$, and between about 10 and about 17 weight percent ZnO, said composition being essentially free of ultraviolet absorbers and having a light transmission at 320 nanometers in excess of 50% through a ½ inch thickness of said composition.

2. A glass composition as defined in claim 1, said composition consisting essentially of the fusion product of 54 weight percent $H_3BO_3$, 32.7 weight percent $La_2O_3$, and 13.3 weight percent ZnO.

References Cited
UNITED STATES PATENTS

| 3,074,805 | 1/1963 | Geffcken et al. | 106—47 Q |
| 2,974,052 | 3/1961 | Bacon et al. | 106—52 |
| 3,503,764 | 3/1970 | Young | 106—50 X |

TOBIAS E. LEVOW, Primary Examiner

W. R. SATTERFIELD, Assistant Examiner

U.S. Cl. X.R.

65—DIG. 7; 106—47 R, 50

UNITED STATES PATENT OFFICE
CERTIFICATE OF CORRECTION

Patent No. 3,677,778          Dated July 18, 1972

Inventor(s) Mir Akbar Ali, Murray A. Schwartz and Pei Ching Li

It is certified that error appears in the above-identified patent and that said Letters Patent are hereby corrected as shown below:

Column 1, line 48, "ess" should read --less--;

Column 1, line 70, "N.A.=$\sqrt{N_1-N_2^2}$" should read --N.A.=$\sqrt{N_1^2-N_2^2}$--.

Signed and sealed this 2nd day of January 1973.

(SEAL)
Attest:

EDWARD M. FLETCHER, JR.  
Attesting Officer

ROBERT GOTTSCHALK  
Commissioner of Patents